(12) United States Patent
Kachelries

(10) Patent No.: US 10,193,491 B2
(45) Date of Patent: Jan. 29, 2019

(54) ROOFTOP HEAT REFLECTOR SYSTEM

(71) Applicant: Wayne J. Kachelries, Morrisville, PA (US)

(72) Inventor: Wayne J. Kachelries, Morrisville, PA (US)

( * ) Notice: Subject to any disclaimer, the term of this patent is extended or adjusted under 35 U.S.C. 154(b) by 20 days.

(21) Appl. No.: 15/166,262

(22) Filed: May 27, 2016

(65) Prior Publication Data

US 2017/0343781 A1 Nov. 30, 2017

(51) Int. Cl.
 *E04B 1/74* (2006.01)
 *E04B 1/76* (2006.01)
 *H02S 20/23* (2014.01)

(52) U.S. Cl.
 CPC ........ *H02S 20/23* (2014.12); *E04B 2001/742* (2013.01); *E04B 2001/7691* (2013.01)

(58) Field of Classification Search
 CPC .......... G02B 1/04; G02B 7/183; G02B 7/182; G02B 17/006; E04B 1/76; E04B 7/18; E04B 2001/742; E04B 2001/7691; E04B 7/04; E04B 7/12; E04B 7/16; E04B 1/80; E04B 1/941; E04B 7/00; E04D 13/00; E04D 12/002; E04D 13/1475; H02S 20/23
 USPC ................. 359/851, 850, 853, 855
 See application file for complete search history.

(56) References Cited

U.S. PATENT DOCUMENTS

| 3,001,331 | A |   | 9/1961 | Brunton |
| 4,498,262 | A |   | 2/1985 | Garcia |
| 4,730,423 | A |   | 3/1988 | Hughes |
| 5,651,226 | A | * | 7/1997 | Archibald ............... E04D 1/045 126/622 |
| 6,811,852 | B2 |  | 11/2004 | Alderman |
| 6,857,238 | B2 |  | 2/2005 | Alderman |
| 8,025,126 | B1 | * | 9/2011 | Lefavor .................... E04G 3/26 182/45 |
| 2004/0062919 | A1 |  | 4/2004 | Kuchenmeister et al. |
| 2005/0120637 | A1 |  | 6/2005 | Bhobe |
| 2005/0225858 | A1 |  | 10/2005 | Dobihal et al. |
| 2007/0175153 | A1 |  | 8/2007 | O'Hara et al. |
| 2008/0277056 | A1 |  | 11/2008 | Kalkanoglu et al. |
| 2012/0017521 | A1 |  | 1/2012 | Botke |

(Continued)

OTHER PUBLICATIONS

Pennants, <http://www.flagandbanner.com/pennants/pennants.asp>, archived Mar. 17, 2015.*

*Primary Examiner* — Jade R Chwasz
(74) *Attorney, Agent, or Firm* — LaMorte & Associates, P.C.

(57) ABSTRACT

A roof reflector system that is used to reflect solar radiation away from a rooftop. The system uses lines of flags that are strung across the rooftop in parallel rows. Each line of flags contains a plurality of flags that are aligned side-by-side. The flags are reflective to solar radiation. A common ribbon joins the flags into a line of flags. The base of each flag is coupled to the ribbon so that the flags hang away from the bottom edge of the ribbon. Brackets are provided that that can be selectively mounted to the roof. Each of the brackets has a connector that receives and retains the ribbon, therein supporting the ribbon at a first elevation above the roof. The length of each of the flags is greater than that first elevation. As a result, the flags touch the roof and fold along the roof, therein shielding the roof from the heat of the sun.

19 Claims, 6 Drawing Sheets

(56) References Cited

U.S. PATENT DOCUMENTS

2016/0145872 A1\* 5/2016 Anderson ............... E04D 3/362
52/588.1

\* cited by examiner

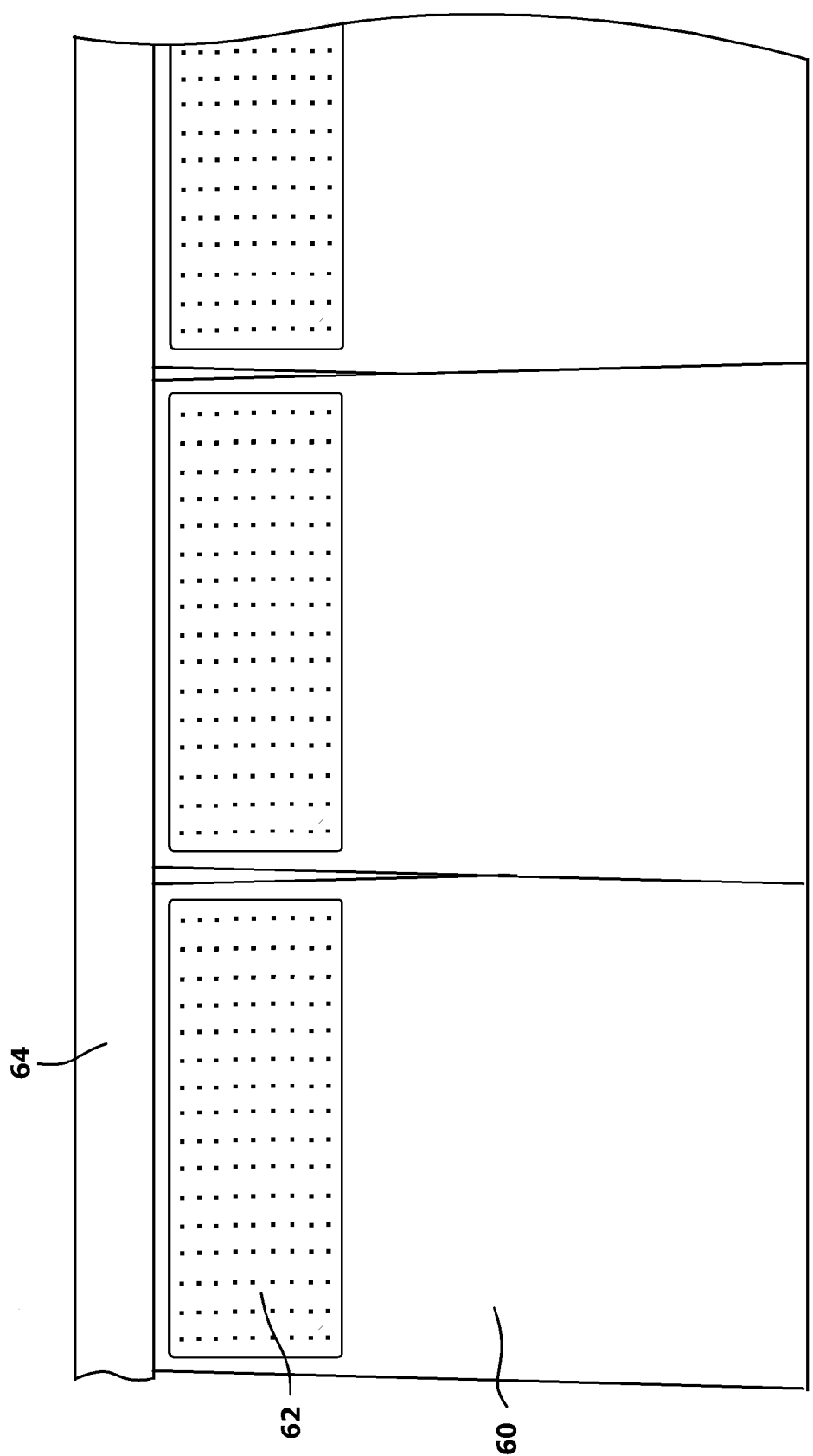

ROOFTOP HEAT REFLECTOR SYSTEM

BACKGROUND OF THE INVENTION

1. Field of the Invention

In general, the present invention relates to physical barriers that are placed atop a roof in order to prevent solar radiation from heating the roof and the building beneath. More particularly, the present invention relates to retrofit barriers that can be mounted to an existing roof without the need to modify or compromise the existing roof.

2. Prior Art Description

The roofs of many buildings are covered in dark roofing shingles and/or roofing tar. As such, the roofs of these buildings absorb solar radiation in the form of heat. The heat is transferred to the rooms of the buildings that lay immediately under the roofs. This is one of the primary reasons that attics of many homes become unbearably hot during the summer.

The transfer of heat from the rooftop to the living space under the roof can be significantly reduced by installing insulation under the structure of the roof. However, many buildings exist where such insulation is absent or insufficient. Furthermore, the use of insulation under a roof does not protect the exterior of the roof from becoming overly hot. In fact, the use of insulation under a roof can limit the ability of the roof to cool and can increase the temperature of the roof to a point where the roofing material becomes compromised. Roofing materials melt or otherwise degrade at a more rapid rate when exposed to excessive heat. Accordingly, the roof must be repaired or replaced more often than would otherwise be necessary.

In the prior art, there are roofing materials that are made to be reflective. For example, there are roofing materials that are mixed with aluminum flakes that can be painted onto a roof. The aluminum flakes provide the roof with a silvery finish that reflects much of the solar radiation from the sun. The problem with such roofing materials is that the reflective roofing material is permanent. Once applied, it cannot be easily removed. Accordingly, the reflective roofing finish is present on the roof through all the seasons. The reflective roofing finish prevents the roof from being warmed by the sun. During the winter, this reduces the rate and degree of snow and ice melting. Accordingly, in some latitudes, ice and snow tends to collect on the roof and clog roof drainage. This, in turn, can cause both water damage and structural damage to the underlying building. The collecting snow and ice can also create a physical danger should a significant volume collect and slide or fall from a roof.

In addition, a reflective rooftop prevents the sun from helping warm a structure during cold months. This can significantly increase the heating costs of a building during the winter in areas with cold winter climates.

In the prior art, some systems have been developed that position a removable reflective surface over a dark roof during the hot months of the year. Such prior art systems are exemplified by U.S. Pat. No. 6,857,238 to Alderman. The problem with such systems is that they attempt to cover an entire roof. As such, the systems use large tarps that are difficult to size, difficult to position and difficult to anchor. Furthermore, the large tarps are easily damaged by storms with heavy rains and/or high winds. Both of which commonly occur during the summer months.

A need therefore exists for a system of adding reflective material to a roof, that is easy to install, easy to remove and highly resistant to damage from wind and weather. This need is met by the present invention as described and claimed below.

SUMMARY OF THE INVENTION

The present invention is a roof reflector system that is used to reflect solar radiation away from a rooftop. The system uses lines of flags that are strung across the rooftop in parallel rows. Each line of flags contains a plurality of flags that are aligned side-by-side. Each of the flags has a base, a length, and exterior surfaces that are reflective to solar radiation.

A common ribbon joins the flags into a line of flags. The ribbon has a top edge and a bottom edge. The base of each of the flags is coupled to the ribbon so that the flags hang away from the bottom edge of the ribbon. A plurality of brackets is provided that that can be selectively mounted to the roof. Each of the brackets has a connector that receives and retains the ribbon, therein supporting the ribbon at a first elevation above the roof. The length of each of said flags is greater than that first elevation. As a result, the flags touch the roof and fold along the roof, therein shielding the roof from the heat of the sun.

BRIEF DESCRIPTION OF THE DRAWINGS

For a better understanding of the present invention, reference is made to the following description of exemplary embodiments thereof, considered in conjunction with the accompanying drawings, in which:

FIG. 6 is a front view of an alternate configuration for the flags used in the roof reflector system.

DETAILED DESCRIPTION OF THE DRAWINGS

Although the present invention roof reflector system can be embodied in many ways, only two embodiments of the present invention are illustrated and described. The illustrated embodiments were selected in order to set forth some of the best modes contemplated for the invention. The illustrated embodiments, however, are merely exemplary and should not be considered limitations when interpreting the scope of the appended claims.

Figure 1:
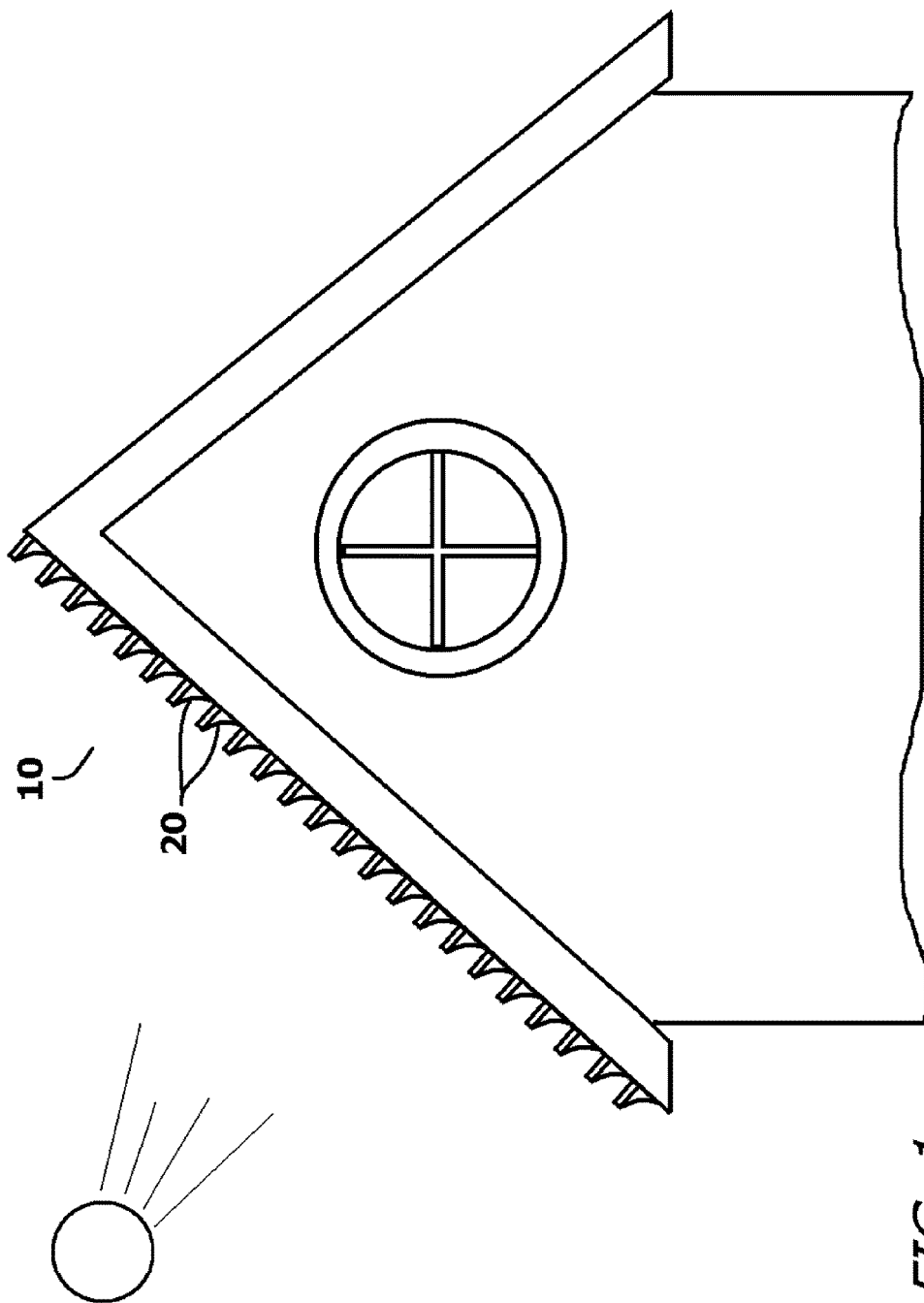
FIG. 1 is a side view of a building's roof having the present invention roof reflector system applied to one side.
Figure 2:
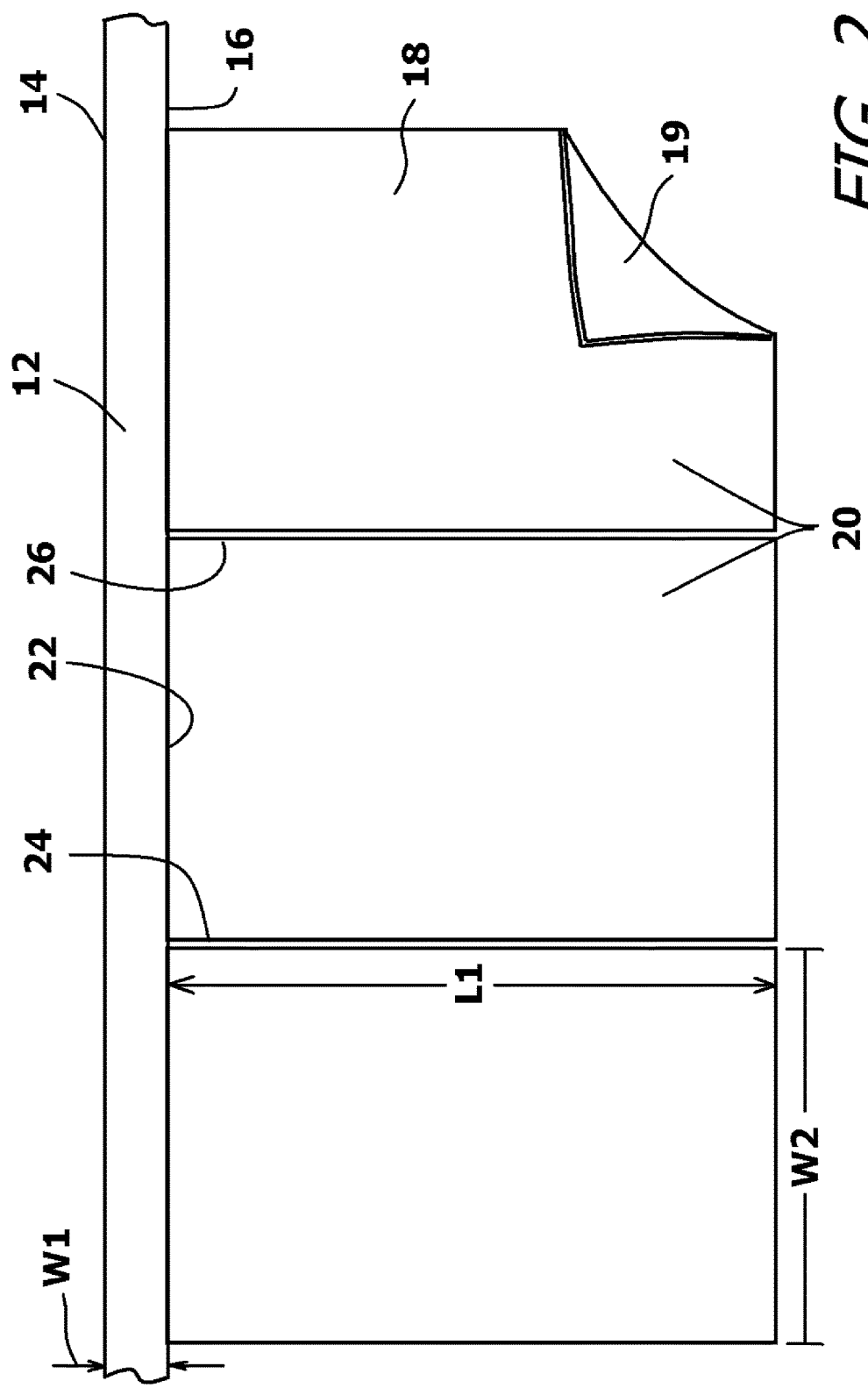
FIG. 2 is a front view of s segment of ribbon and flags used in the roof reflector system.
Figure 3:
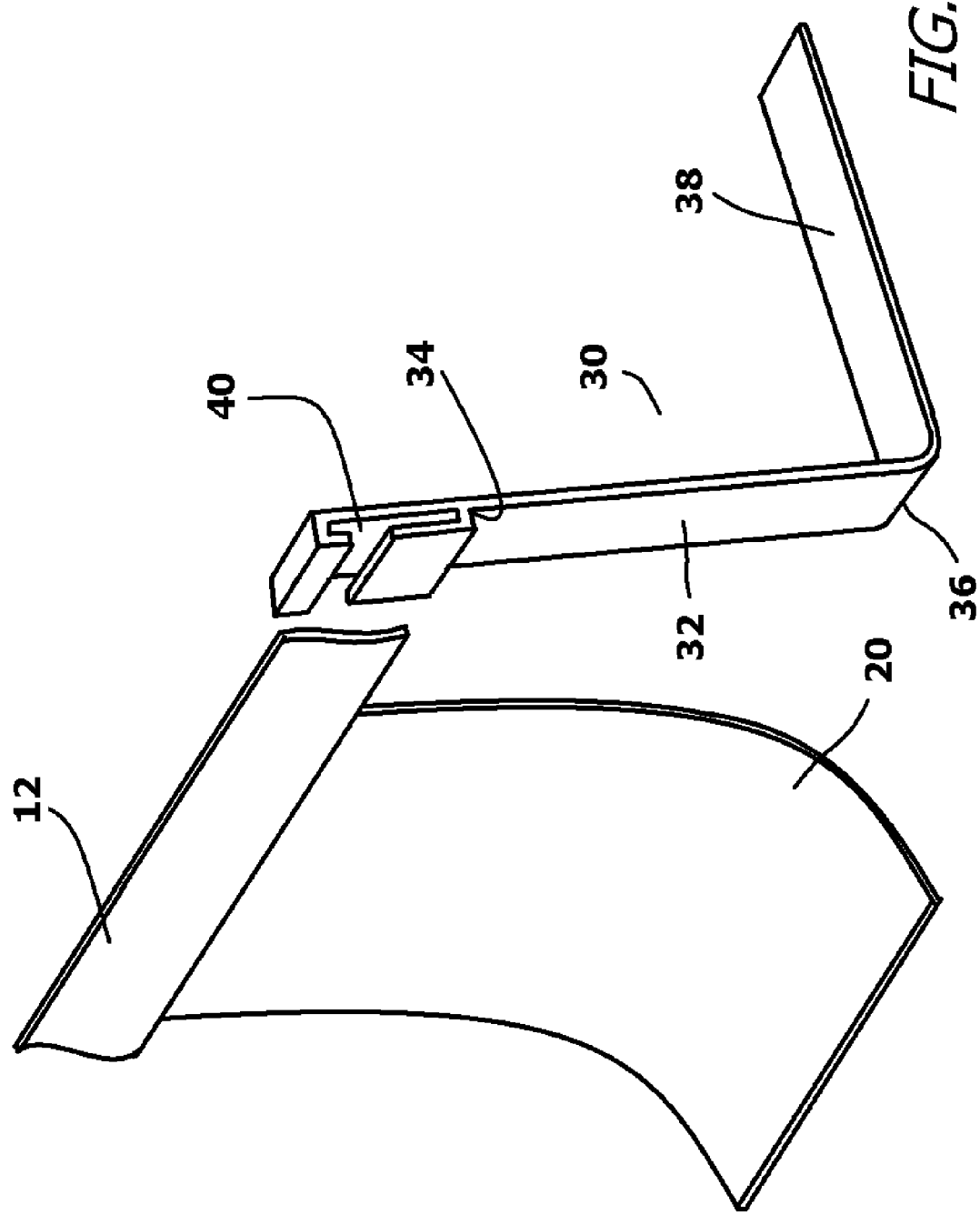
FIG. 3 is a perspective view of a bracket and a segment of a ribbon and flag, which are used in the roof reflector system.

Referring to FIG. 1 in conjunction with FIG. 2 and FIG. 3, the hardware and application of the roof reflector system 10 are shown. The purpose of the roof reflector system 10 is to reflect sunlight away from a roof. Accordingly, the roof reflector system 10 is mounted on a roof in order to shield the roof.

The roof reflector system 10 is comprised of a length of reinforced ribbon 12. The reinforced ribbon 12 has a top edge 14 and a bottom edge 16 with a preferred width W1 of between inch and two inches between the top edge 14 and the bottom edge 16. The wide width W1 helps inhibit the reinforced ribbon 12 from twisting as it encounters forces from weather and wind. The reinforced ribbon 12 has a tear tensile strength of at least fifty pounds. As such, the reinforced ribbon 12 will not break or tear in high winds. To reduce the cost of the reinforced ribbon 12, the reinforced ribbon 12 may be constructed of lower strength materials that are reinforced with an internal layer of plastic mesh or synthetic string to provide the needed tensile strength. The exterior of the reinforced ribbon 12 is preferably white or reflective so it reflects radiant heat away.

A plurality of flags 20 are provided. Each of the flags 20 has a base 22 and a length L2. The base 22 of each flag 20 is attached to the ribbon 12. The flags 20 all extend from the bottom edge 16 of the reinforced ribbon 12 and are held in place by stitching or another type of permanent seam. The flags 20 each have a width W2 between the side edges 24, 26. In the shown embodiment, the side edges 24, 26 are parallel and the width W2 of the flags 20 remain constant along the entire length L2. The width W2 is preferably between three inches and eight inches. The length L2 is preferably between six inches and twenty-four inches. The flags 20 are otherwise flat and have a thickness no greater than the combined thickness of the layers of material laminated together to form the flag 20. The flags 20 can be attached to the ribbon in an overlapping pattern. However, in the shown embodiment, the side edges 24, 26 of adjacent flags 20 abut each other without any overlap. This is the most cost effective construction.

Each of the flags 20 has a face surface 18 and an opposite rear surface 19. The face surface 18 and the rear surface 19 are highly reflective to solar radiation. As such, the flags 20 tend to be white, silver, or mirrored in coloration. The flags 20 are also lightweight and tear resistant. Each of the flags 20 is preferably made from a bi-axially oriented polyethylene terephthalate, such as Mylar® or an appropriately colored flash-spun material of high-density polyethylene fibers, such as Tyvek®. The flags 20 can be made further tear resistant by laminating a high strength mesh material between layers of Mylar® or Tyvek®.

The weight of the flags 20 is also important. The flags 20 should have a thick enough gauge so that they naturally hang down from the reinforced ribbon 12 and do not flutter in very light winds, i.e under five miles per hour. However, the flags 20 should be light enough to lift and flutter in strong winds, i.e. over twenty miles per hour. Depending upon the construction used in the formation of the flags 20, the preferred thickness of the flags 20 creates a corresponding density of between one once and three ounces per square foot.

In FIG. 3, the details of the bracket 30 are shown. The bracket 30 is used to support the reinforced ribbon 12 and flags 20 on a rooftop. Each bracket 30 has a vertical shaft 32. The vertical shaft 32 has two opposite ends 34, 36. A flattened leg 38 extends from the second end 36 of the vertical shaft 32 at a right angle. On a flat roof, a sandbag or brick can be placed atop the flattened leg 38 to hold the bracket 30 in place on the flat roof. On a slanted shingled roof, the flattened leg 38 can be inserted under a roofing shingle to hold the bracket 30 in place.

The vertical shaft 32 of each bracket 30 has a length between the first end 34 and the second end 36 that is between one-half and three-quarters the length L2 of the flags 20. In this manner, when the flags 20 are attached to the brackets 30, the flags 20 are not fully suspended in the air. Rather, at least twenty-five percent of each flag 20 remains in contact with the material of the roof top.

The first end 34 at the top of each vertical shaft 32 terminates with a ribbon receptacle 40. The ribbon receptacle 40 is shaped and sized to engage and retain the reinforced ribbon 12. In the shown embodiment, the ribbon receptacle 40 is configured as a narrow slotted clip that is sized to receive a segment of the reinforced ribbon 12. The ribbon receptacle 40 does more than connect the reinforced ribbon 12 to the bracket 30. The ribbon receptacle 40 also orients the reinforced ribbon 12 so that the bottom edge 16 of the reinforced ribbon 12 will face toward the rooftop and the top edge 14 of the reinforced ribbon 12 will face away from the rooftop. In this manner, the interconnection between the reinforced ribbon 12 and the bracket 30 biases the reinforced ribbon 12 into its optimal operating orientation.

Figure 4:
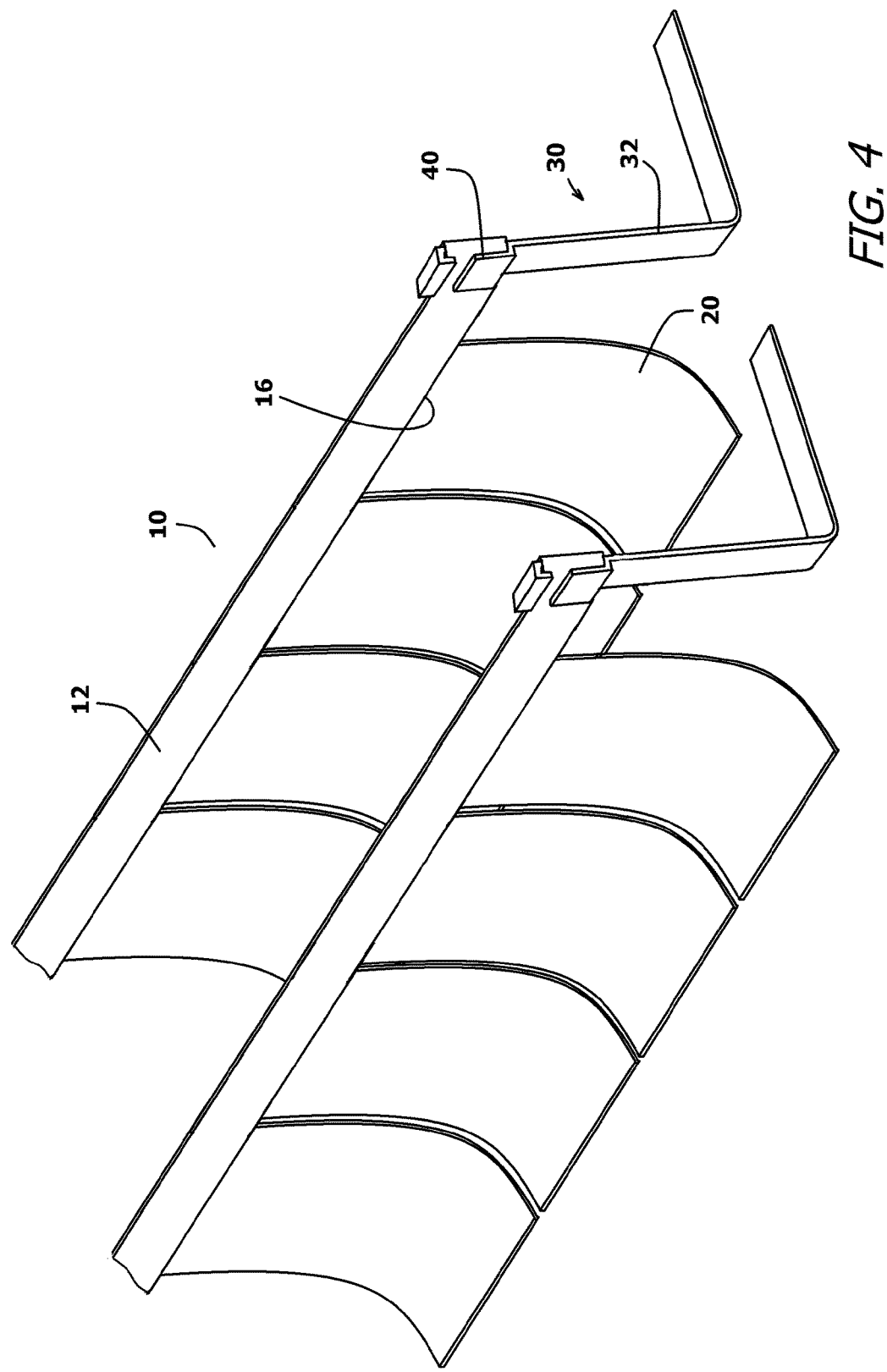
FIG. 4 is a perspective view of segments of two rows of ribbons, flags, and brackets which comprise the roof reflector system.

Referring to FIG. 4 in conjunction with FIG. 2 and FIG. 3, it can be seen that the brackets 30 are connected to a roof. The vertical shafts 32 of the bracket are held at a perpendicular to the surface of the roof where the bracket 30 attaches. As such, if the roof is sloped, the vertical shafts 32 of the brackets are inclined with respect to the vertical at a complimentary angle.

The reinforced ribbon 12 is strung between the brackets 30 in parallel rows on the roof. As each reinforced ribbon 12 is strung through the ribbon receptacles 40 on the brackets 30, the bottom edge 16 of the reinforced ribbon 12 is oriented downwardly. This causes the flags 20 to protrude downwardly toward the surface of the roof. Since the brackets 30 are inclined with the slope of the roof and the flags 20 are longer than the height of the brackets 30, the flags 20 extend from the reinforced ribbon 12 and bend against the surface of the roof on the downward slope of the roof. The flags 20 are opaque and are highly reflective to solar radiation. As such, the flags 20 shield the underlying roof from sunlight by shading the underlying roof. Although each flag 20 is separate below the reinforced ribbon 12, the flags 20 abut or overlap. As such, when hanging straight, no significant gaps exist between the flags 20. This completely shields the roof when sunlight is impinging at an acute angle.

The flags 20 are longer than the height of the brackets 30. As such, the flags 20 touch and fold over the roof when the flags 20 are suspended from the reinforced ribbons 12. This shades the roof when the sun is high and shines light directly onto the roof from above.

By reflecting sunlight away from the roof, the roof reflector system 10 can reduce the amount of solar radiation absorbed by the roof by up to ninety percent. As the seasons progress and the ambient air becomes cooler, the reinforced ribbon 12 can simply be detached from the brackets 30 and the flags 20 removed. The roof is then free to directly absorb solar energy, when it is beneficial to the building owner.

The flags 20 extend from the bottom edge 16 of the reinforced ribbon 12 and are biased against the downhill side of the roof by gravity. In this orientation, the flags 20 offer no impedance to rain water that may flow down the roof toward the gutters. Likewise, should the wind blow, the flags 20 are free to rotate with the reinforced ribbon 12 and flutter in the breeze. This prevents the flags 20 from breaking, tearing or applying unsafe loads to the structure of the roof or the roofing shingles where the brackets 30 attach.

Figure 5:
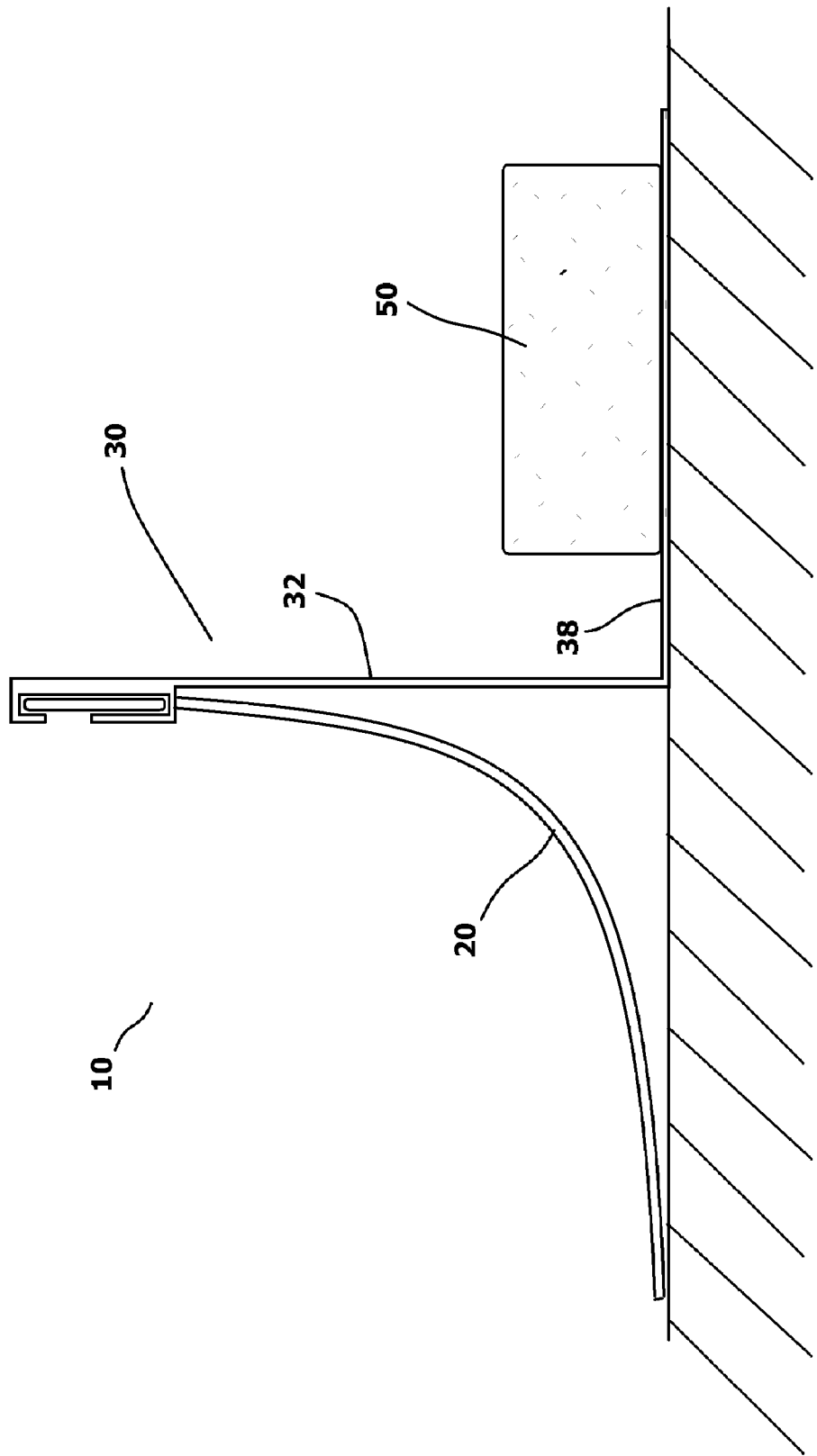
FIG. 5 is a side view of the roof reflector system in an application on a flat roof.

Referring to FIG. 5, a different application for the roof reflector system 10 is shown. In this application, the roof reflector system 10 is applied to a flat roof that has only a minimal inclination for drainage. In such an application, the brackets 30 are set in place by placing weights 50 on the flattened leg 38 of the bracket 30. The use of weights 50 prevents the need for having to drive screws or bolts into the structure of the roof.

When applied to a flat roof, the flags 20 will be biased by gravity to hang straight below the reinforced ribbon 12. To ensure that the flags 20 fully shade the roof, the flags 20 are preferably made longer or the brackets 30 shorter to ensure that a significant portion of each flag folds against the surface of the roof. In the preferred embodiment, the overlap is sufficient to cover the distance on the roof between one line of flags and an adjacent line of flags. In this manner, the entire surface of the roof is shaded regardless of the angle of the sun relative the roof.

Referring to FIG. 6, an alternate configuration of the flags 60 is illustrated. In this embodiment, a solar cell 62 is connected to each of the flags 60 proximate the reinforced ribbon 64. Wires run through the reinforced ribbon 64 to electrically interconnect the solar cells 62 on the flags 60. The electricity produced by the solar cells 62 is collected at the ends of each run of the flags 60.

The solar cells 62 are high enough on the flags 60 so that the heat absorbed by the solar cells 62 is not transferred to the roof surface under the flags 60. Furthermore, the presence of the solar cells 62 provides weight to each of the flags 60. This helps hold the flags 60 in position during windy conditions. The wires running through the reinforced ribbon 64 add significantly to the tensile strength of the reinforced ribbon 64. As such, the reinforced ribbon 64 is capable of holding the extra weight of the solar cells, even during storm conditions. Furthermore, in FIG. 6, the flags 60 are shaped to slightly overlap. This helps prevent light from passing the line of flags between adjacent flags.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A reflector system for reflecting solar radiation away from a roof, said system comprising:
   a plurality of brackets, wherein each of said plurality of brackets has a first end, a second end, and a first length that extends between said first end and said second end, wherein said second end of each of said plurality of brackets contacts said roof causing said first end of each of said plurality of brackets to extend away from said roof by said first length;
   a plurality of flags, wherein each of said plurality of flags has a base, a second length, and exterior surfaces along said second length that are reflective to solar radiation, wherein said second length of each of said plurality of flags is longer than said first length of each of said plurality of brackets;
   a common ribbon having a top edge and a bottom edge, wherein said base of each of said plurality of flags are coupled to said ribbon so that said second length of each of said plurality of flags hang away from said bottom edge of said ribbon;
   wherein said ribbon attaches to said first end of each of said plurality of brackets therein supporting said ribbon away from said roof, wherein said plurality of flags hang from said ribbon and are suspended between said ribbon and said roof.

2. The system according to claim 1, wherein each of said plurality of flags has side edges along said second length, wherein said side edges between each of said plurality of flags are in direct abutment when hanging from said ribbon.

3. The system according to claim 2, wherein said side edges of each of said plurality of flags are parallel.

4. The system according to claim 3, wherein each of said plurality of flags has a width between said side edges of between two inches and twelve inches.

5. The system according to claim 1, wherein each of said plurality of flags has side edges along said second length, wherein said side edges between each of said plurality of flags at least partially overlap when hanging from said ribbon.

6. The system according to claim 1, wherein each of said plurality of brackets has a shaft between said first end and said second end, wherein a connector for engaging said ribbon terminates said shaft at said first end and a leg extends from said second end of said shaft at a perpendicular.

7. The system according to claim 1, wherein said ribbon has a width between said top edge and said bottom edge of between ½ inch and two inches.

8. The system according to claim 1, wherein each of said plurality of flags includes a tear resistant material selected from a group consisting of a bi-axially oriented polyethylene terephthalate and flash spun high-density polyethylene fibers.

9. he system according to claim 1, wherein said second length of each of said plurality of flags is at least twenty five percent longer than said first length of said plurality of brackets.

10. A reflector system for reflecting solar radiation away from a roof, said system comprising:
    flags that are interconnected by a common ribbon, wherein each of said flags has a base, a first length, and exterior surfaces along said first length that are reflective to solar radiation;
    brackets wherein each of said brackets has a first end, a second end, and a second length that extends between said first end and said second end, wherein said second end of each of said brackets contacts said roof causing said first end of each of said brackets to extend away from said roof by said second length, and wherein said first end of each of said brackets receives said ribbon and supports said ribbon away from said roof by said second length, wherein each of said flags is suspended from said ribbon between said ribbon and said roof.

11. The system according to claim 10, wherein said ribbon has a top edge and a bottom edge, wherein said base of each of said flags is coupled to said ribbon so that said first length of each of said flags hangs away from said bottom edge of said ribbon.

12. The system according to claim 10, wherein each of said flags has side edges along said first length, wherein said side edges between each of said flags are in direct abutment when hanging from said ribbon.

13. The system according to claim 10, wherein each of said flags has side edges along said first length, wherein said side edges at least partially overlap when said flags are hanging from said ribbon.

14. The system according to claim 10, wherein said first length of each of said flags is at least twenty five percent longer than said first elevation.

15. The system according to claim 10, wherein each of said brackets has a shaft between said first end and said second end, wherein a connector for engaging said ribbon terminates said shaft at said first end and a leg extends from said second end of said shaft at a perpendicular.

16. The system according to claim 13, wherein said side edges of each of said flags are parallel.

17. A method of reflecting solar radiation from a roof of a building, comprising the steps of:

mounting brackets to the roof;
providing a line of flags, wherein said line of flags includes flags interconnected by a ribbon;
stringing said ribbon between said brackets, wherein said brackets support said ribbon at a first elevation above the roof so that said flags are suspended by said ribbon between said ribbon and said roof; and
wherein said flags have a length that enable portions of said flags to contact said roof and fold over an area of said roof.

18. The method according to claim 17, wherein said ribbon has a top edge and a bottom edge, wherein each of said flags is coupled to said ribbon so that said length of each of said flags hangs away from said bottom edge of said ribbon.

19. The method according to claim 18, wherein each of said flags has parallel side edges and a face surface that is reflective.

\* \* \* \* \*